(12) United States Patent
Gimpel et al.

(10) Patent No.: US 11,698,442 B2
(45) Date of Patent: Jul. 11, 2023

(54) OPTOELECTRONIC SENSOR AND METHOD FOR DETECTING OBJECTS

(71) Applicant: SICK AG, Waldkirch (DE)

(72) Inventors: Hartmut Gimpel, Waldkirch (DE); Matthias Jägel, Waldkirch (DE)

(73) Assignee: SICK AG, Waldkirch (DE)

( * ) Notice: Subject to any disclaimer, the term of this patent is extended or adjusted under 35 U.S.C. 154(b) by 939 days.

(21) Appl. No.: 16/601,965

(22) Filed: Oct. 15, 2019

(65) Prior Publication Data

US 2020/0124708 A1    Apr. 23, 2020

(30) Foreign Application Priority Data

Oct. 18, 2018 (DE) .......................... 102018125826.7

(51) Int. Cl.
  *G01S 7/481* (2006.01)
  *G01S 17/10* (2020.01)

(52) U.S. Cl.
  CPC .......... *G01S 7/4815* (2013.01); *G01S 7/4816* (2013.01); *G01S 7/4817* (2013.01); *G01S 17/10* (2013.01)

(58) Field of Classification Search
  CPC .............................. G01S 7/4815; G01S 7/4816
  See application file for complete search history.

(56) References Cited

U.S. PATENT DOCUMENTS

| 5,598,263 | A  | 1/1997 | Safa |
| 2006/0187470 | A1 | 8/2006 | Massey et al. |
| 2006/0227317 | A1* | 10/2006 | Henderson .............. G01S 17/89 356/28 |
| 2011/0261368 | A1 | 10/2011 | Ohtomo et al. |
| 2015/0219763 | A1 | 8/2015 | Nubling |
| 2018/0292512 | A1 | 10/2018 | Gimpel et al. |

FOREIGN PATENT DOCUMENTS

| CN | 107861317 A | 3/2018 |
| DE | 69501072 T2 | 6/1998 |
| DE | 19757849 B4 | 12/2004 |

(Continued)

OTHER PUBLICATIONS

European Search Report dated Aug. 14, 2019; Application No. 102018125826.7.

*Primary Examiner* — Jerry T Jean Baptiste
(74) *Attorney, Agent, or Firm* — Nath, Goldberg & Meyer; Jerald L. Meyer

(57) ABSTRACT

An optoelectronic sensor is provided that has at least one light transmitter for transmitting a plurality of mutually separated light beams starting from a respective one transmission point; a transmission optics for the transmitted light beams; at least one light receiver for generating a respective received signal from the remitted light beams reflected from the objects and incident at a respective reception point; a reception optics for the remitted light beams; and an evaluation unit for acquiring information on the objects from the received signals. The reception optics and/or the transmission optics is/are a two-lens objective for an annular image field with an image field angle that has a first lens and a second lens, with the first lens being configured such that bundles of rays of every single transmission point and/or reception point with an image field angle α only impinge on half of the second lens.

17 Claims, 3 Drawing Sheets

(56) References Cited

FOREIGN PATENT DOCUMENTS

Figure 1:
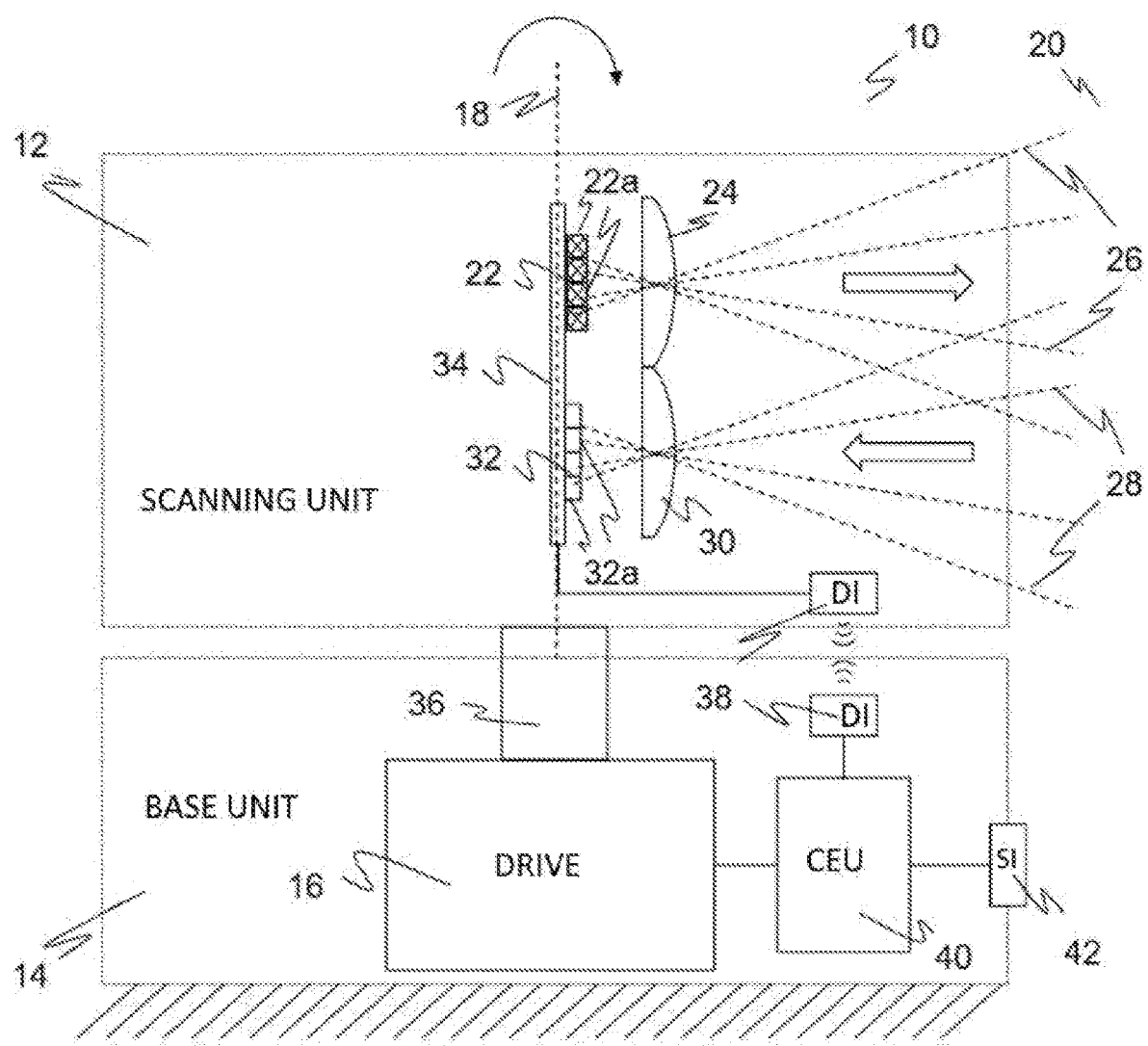

| | | |
|---|---|---|
| DE | 102014101312 B3 | 12/2014 |
| DE | 102015121839 A1 | 6/2017 |
| DE | 102017107666 A1 | 10/2018 |
| EP | 3045936 A1 | 7/2016 |
| JP | H8-178749 A | 7/1996 |
| JP | 2009236774 A | 10/2009 |
| JP | 2015-148605 A | 8/2015 |

* cited by examiner

OPTOELECTRONIC SENSOR AND METHOD FOR DETECTING OBJECTS

The invention relates to an optoelectronic sensor and to a method for detecting objects in a monitored zone in accordance with the preambles of the respective independent claim.

Many optoelectronic sensors work in accordance with the sensing principle in which a light beam is transmitted into the monitored zone and the light beam reflected by objects is received again in order then to electronically evaluate the received signal. The time of flight is here often measured using a known phase method or pulse method to determine the distance of a sensed object.

To expand the measured zone of a single-beam light scanner, the scanning beam can be moved, on the one hand, as is the case in a laser scanner. A light beam generated by a laser there periodically sweeps over the monitored zone with the help of a deflection unit. In addition to the measured distance information, a conclusion is drawn on the angular location of the object from the angular position of the deflection unit and the location of an object in the monitored zone is thus detected in two-dimensional polar coordinates.

Another possibility for extending the measured zone and for acquiring additional distance data comprises simultaneously detecting a plurality of measured points using a plurality of scanning beams. This can also be combined with a laser scanner that then does not only detect a monitored plane, but also a three-dimensional spatial zone via a plurality of monitored planes. The scanning movement is achieved by a rotating mirror in most laser scanners. Particularly on the use of a plurality of scanning beams, however, it is also known in the prior art to instead have the total measurement head with the light transmitters and light receivers rotate, as is described, for example, in DE 197 57 849 B4.

In principle, a plurality of scanning beams can be achieved by a multiplication of the elements of a single-beam device. However, this is unnecessarily expensive and complex. There are therefore approaches in the prior art to use elements multiple times. In DE 10 2015 121 839 A1, for instance, the scanning beams of a plurality of light transmitters are formed by a common transmission optics and are deflected in the desired direction.

It is now admittedly desirable to use the transmission optics or also the reception optics simultaneously for a plurality of beams. However, contradictory demands are made on the optics here. It should, on the one hand, be as simple as possible for cost reasons, but should image all the beams in focus simultaneously in an image field that is as large as possible.

A simple optics can be implemented with the aid of a single lens. However, only a small image field angular range of at most ±5° is possible with it under the given conditions of a sufficiently large aperture, for example with an f-number k≤3 and with small dot images. Only densely disposed scanning beams can consequently be implemented with a single lens. With a sensible mutual interval of some degrees and with said image field angles of <5°, a single lens does not permit more than two or three scanning beams and thus does not permit any larger measured zones of, for example, 30°.

On the other hand, there is also the possibility of dispensing with a simple optics and of using a multi-lens objective. Small dot images can also be generated with them over a larger image field angle of, for example, ±20°. However, as a rule, at least three lenses that also have to be adjustable per se are required for this purpose.

Even if the higher manufacturing and adjustment costs are accepted, optical compromises still also have to be made. While f-numbers of k=1 can substantially only be achieved at 0° along the optical axis for an image field with single lenses, an f-number of k≤3 or even k≤2 can only be achieved with difficulty with objectives for a large image field of, for example, ±15°. However, the range of the device is reduced with a smaller receiving aperture. A further disadvantage of a multi-lens objective is that the main beam is incident on the image plane with a fairly large angle. If such an objective is used as the transmission optics, it becomes necessary to tilt the light sources to be incident on the objective at all. The alternative of a telecentric objective in which the main beam angle remains very small cannot be considered because this then requires a lot more than three lenses.

It is therefore the object of the invention to simplify and improve a multi-beam system of the category.

This object is satisfied by an optoelectronic sensor and by a method for detecting objects in a monitored zone in accordance with the respective independent claim. The sensor in accordance with the invention is a multi-sensor that transmits a plurality of light beams from one respective transmission point by at least one light transmitter. Each transmission point is effectively a light transmitter from which the respective transmitted light beam originates, with it, however, initially not being absolutely necessary that physical light transmitters are located at the transmission points. Instead, in some embodiments, one physical light transmitter can also generate a plurality of transmitted light beams at a plurality of transmission points or at all the transmission points, as will be explained below. The transmitted light beams are furthermore not to be understood as rays in the sense of geometrical optics within a larger bundle of rays, but rather as mutually separate bundles of rays and thus isolated scanning beams that generate correspondingly isolated, mutually spaced apart light spots in the monitored zone on impinging onto an object.

At least one light receiver is able to generate a respective received signal from the light beams that are remitted from different directions, that are reflected at the objects, and that are incident at a respective reception point. In a similar manner to the statements on the transmission points, the reception points are effectively light receivers without a light receiver physically having to be located at each reception point. Received signals generated in this manner are evaluated to acquire information on the object.

The transmitted light beams pass through a transmission optics that, for example, provides that the transmitted light beams have a desired beam shape, a clear separation from one another, or specific irradiation directions. Only one transmission optics is provided here for all the light beams of all the transmission points. It is, however, conceivable to combine a plurality of modules that each have a plurality of transmission points and only one transmission optics for a sensor having a very large number of beams. The same applies accordingly to the remitted light beams and to their common reception optics.

The invention starts from the basic idea of using a two-lens objective for a circular image field with an image field angle α as the transmission optics and/or reception optics. A two-lens objective comprises exactly two lenses, that is a first lens and a second lens and no further lens, with the lenses in particular being converging lenses. The first lens is shaped such that incident bundles of rays for every single image point or transmission point and/or reception point with an image field angle α are only incident on a respective half of the second lens. Such bundles of rays, and indeed preferably all the bundles of rays with an image field angle α, are therefore only located at the level of the second lens at one respective side of the optical axis. Bundles of rays from field points disposed opposite with respect to the optical axis do not overlap one another in the plane of the second lens. They just no longer illuminate the center of the second lens in this manner. Unlike conventional objectives, no large contiguous range of image field angles are therefore used here such as—α ... 0° ... α, but only a single discrete image field angle α. The image field angle α can include a certain tolerance environment within which these properties are still just sufficiently satisfied.

The invention has the advantage that useful properties of both a single lens and of an objective are combined using the specific two-lens objective design. A two-lens objective is naturally simpler to produce and to adjust than a three-lens or multi-lens objective. The degrees of design freedom are in turn more restricted, but are utilized in accordance with the invention such that a plurality of scanning beams are imaged in focus over a larger image field despite the smaller effort. Field angles of, for example, ±20° are possible without increasing the dot images that satisfy a demand such as <0.5 mrad. A large number of mutually spaced apart beams thus become possible with the same optics and in this respect the performance is not less than with a three-lens or multi-lens objective. This is possible in that sharply delineated beams are not required everywhere, but only on an annulus corresponding to the image field angle α. The two-lens objective, however, unlike a multi-lens objective, still enables a large aperture of k≤2 or even of k=1, that is a small f-number and thus a large aperture and a large range. It is even possible to keep the main beam angle very small in the image plane and thus to design an objective that is almost telecentric at the image side. On a use in the transmission path, the beam sources then do not have to be tilted, but can be soldered on a circuit board in a flat manner.

The inequality d≥(D1*f1)/(D1+2*f1*tan α) is preferably satisfied for the two-lens objective, with a focal length f1 and a diameter D1 of the first lens and a distance d between the first lens and the second lens. The distance d is here preferably measured between the main plane of the first lens and the first effective lens surface of the second lens, that is that lens surface that faces the first lens. This is a mathematical formulation for the already presented condition that lights beams having an image field angle α are only incident on half of the second lens.

Equality, i.e. d=(D1*f1)/(D1+2*f1*tan α), preferably applies at least approximately. At least approximately means that a certain tolerance of, for example, 5% or 10% is still possible and the properties of the optics do not change abruptly. It is rather a question of still observing a distance of the second lens from the image plane of the optics that is as large as possible under the condition of the inequality so that the second lens can also develop a still noticeable effect. The equality is here an optimum in the sense that this distance is maximized and this optimum can also only be approximately reached with said tolerance.

The focal length f2 of the second lens preferably corresponds to the distance between the first lens and the second lens. The two-lens objective then becomes telecentric at the image side. This inter alia allows, as already addressed, the beam sources to be aligned in parallel with one another on a use as a transmission optics. The distance between the first lens and the second lens is preferably not the already introduced distance d at this point, but rather the distance d' between the main planes of both lenses different by approximately half the center thickness of the second lens. This does not, however, necessarily have to be observed in this manner. In a similar manner to that discussed in the previous paragraph, a focal length of f2 approximately similar to the distance between the first and second lenses also already brings about advantages; the two-lens objective is then at least almost telecentric at the image side and at least one tolerance can easily be accepted within the framework of half the center thickness.

The first lens preferably has a small f-number k1, in particular k1=1. It is an advantage of the two-lens objective with respect to multi-lens objectives that this is possible at all. This selection of k1 also results in a small value k for the f-number of the total objective. A particularly sensitive sensor with a long range can be implemented with such a small f-number.

The transmission points are preferably arranged on a first circular line and/or the reception points are arranged on a second circular line. The annuli correspond to the image field angle α for which the two-lens objective is designed. With this mutually matching arrangement of transmission points or reception points and the two-lens objective, its optimized properties are actually used while design compromises possibly accepted in turn no longer have any effect for other image field angles. A circular arrangement of the transmission points and reception points in particular seems counterproductive at first glance for a laser scanner since a one-dimensional arrangement on a simple line with which a plane group is then scanned by a rotational movement would be sufficient there. However, the line, unlike an annulus, could not be imaged over the required large image range by a two-lens object with the high quality in accordance with the invention. In addition, it is also possible with transmission points and reception points arranged to form a circular line to scan planes arranged equidistantly in a laser scanner since the offset in the direction of rotation of the laser scanner only effects a time offset of the measurement that can also be compensated if required.

The first circular line is preferably centered about the optical center axis of the transmission optics and/or the second circular line is centered about the optical center axis of the reception optics. In other words, the optical center axes of the respective optics extend through the circle center of the circular line. The light beams then each undergo the same beam shaping effects and deflection effects with rotationally symmetrical properties of the optics.

The transmission points are preferably evenly distributed over the first circular line and/or the reception points are evenly distributed over the second circular line. Such an even arrangement in which the transmission points or reception points form a regular n-gon is simpler to handle, in particular to obtain equal angular intervals between the scanning beams. An irregular distribution over the circular line, however, also remains possible and this in no way precludes nevertheless setting equal angular intervals between the scanning beams.

Three or more transmission points or reception points are preferably provided. Five, six, eight, or sixteen can be named as particularly advantageous. With a number of four, the transmission points and/or the reception points are preferably not arranged to form a square or a rectangle. It must be repeated that the number can also relate to a transmission/reception module of which a plurality can be installed in an optical sensor. The total number of scanning beams is then added up from the numbers of installed modules and further numbers can thus be constructed.

The sensor preferably has a plurality of light transmitters or light receivers, in particular one light transmitter per transmission point and/or a plurality of light receivers or light reception elements, in particular one light receiver per reception point. The transmitted light beams are therefore generated in part, if not in full, directly by their own light transmitters at the transmission points and the same applies accordingly to the remitted light beams, to the reception points and to the light receivers.

A beam splitter element is preferably associated with the light transmitter to split its light into a plurality of transmitted light beams. A single physical light transmitter is thus responsible for a plurality of transmission points or even for all the transmission points. It is also conceivable to split the light of a plurality of physical light transmitters, for example to obtain six transmission points from two light transmitters with a light beam split three times.

The light receiver is preferably spatially resolved and has a plurality of active zones at the reception points. In this embodiment, the same light receiver is responsible for a plurality of reception points or even for all the reception points. For this purpose, the light receiver in particular has a pixel matrix and only the pixel or pixels at the reception points is/are used to acquire a received signal. The remaining pixels possibly also generate signals that can, however, be ignored or not read. It is also conceivable to fully deactivate such pixels, for instant to directly only bias the pixels at the reception points above the breakdown voltage in a SPAD (single photon avalanche diode) matrix.

The light transmitters and light receivers preferably form a coaxial arrangement and the transmission optics and the reception optics are combined in a common optics. This produces a particularly compact design. There is then in total only one two-lens objective as the common optics that acts in a dual role as a transmission and reception optics.

The sensor is preferably configured as a laser scanner and has a moving deflection unit with whose aid the transmitted light beams are conducted periodically through the monitored zone. As explained in the introduction, the laser scanner scans the monitored zone in a plurality of zones with the movement of the moving deflection unit. A greater plane distance or a greater spatial angular range covered overall by the scanning planes is made possible in elevation by the large image field of the two-lens objective. The deflection unit is preferably configured in the form of a rotatable scanning unit that practically forms a movable measurement head in which at least the light transmitter optical together with the common transmission optics and possibly also the light receiver and least parts of the evaluation unit are accommodated.

The evaluation unit is preferably configured to determine a distance of the object from a time of flight between the transmission of the light beams and the reception of the remitted light beams. The sensor thereby becomes distance measuring. Alternatively, only the presence of an object is determined and is output as a switching signal, for example.

The method in accordance with the invention can be further developed in a similar manner and shows similar advantages in so doing. Such advantageous features are described in an exemplary, but not exclusive manner in the subordinate claims dependent on the independent claims.

Figure 2A:
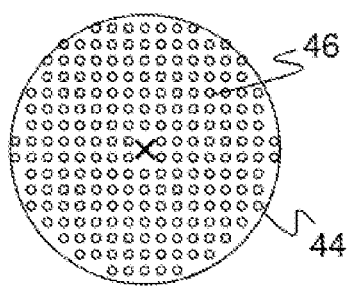
Figure 2B:
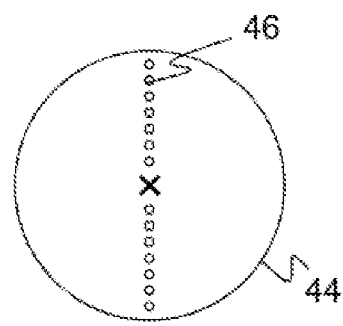
Figure 2C:
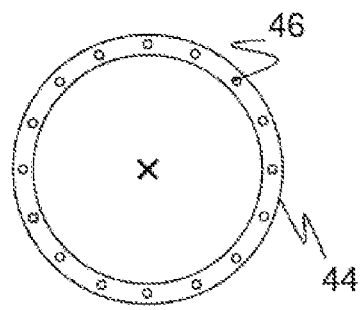
Figure 3:
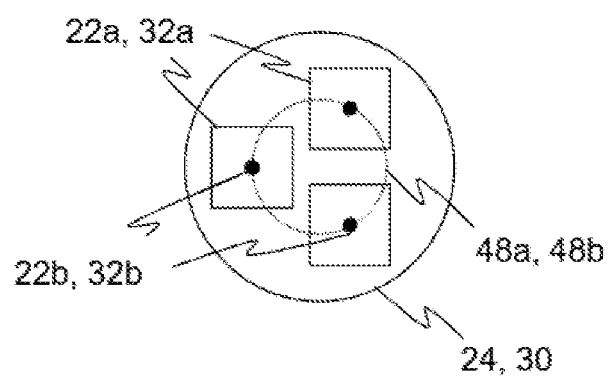
Figure 4:
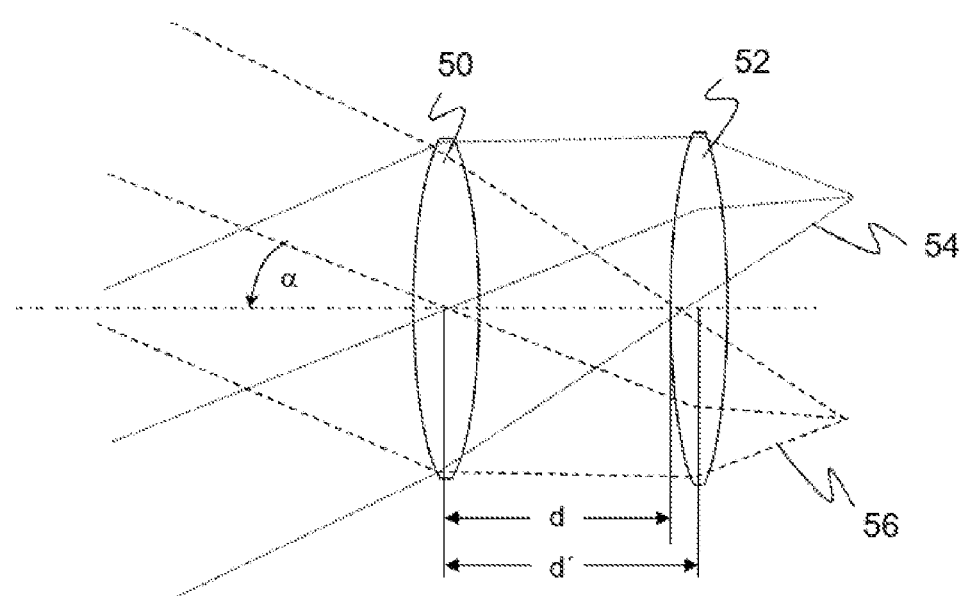
Figure 5:
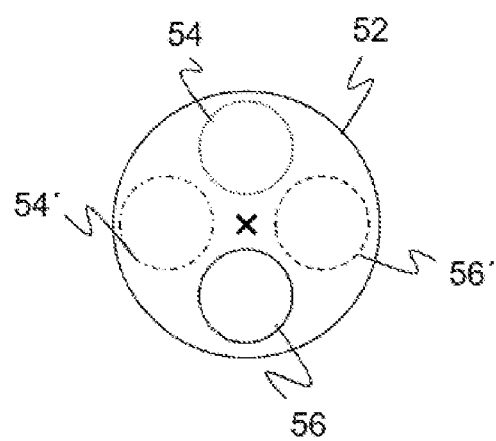

The invention will be explained in more detail in the following also with respect to further features and advantages by way of example with reference to embodiments and to the enclosed drawing. The Figures of the drawing show in:

FIG. 1 a schematic sectional representation of a laser scanner;

FIG. 2a a schematic view of a circular arrangement of image field points;

FIG. 2a a schematic view of a linear arrangement of image field points;

FIG. 2c a schematic view of an annular arrangement of image field points;

FIG. 3 a plan view of circularly arranged transmission points and reception points;

FIG. 4 a schematic view of a two-lens objective for an annular image field with exemplary beam progressions; and FIG. 5 a schematic plan view of the second lens of the objective in accordance with FIG. 4 to illustrate the optical effect of the first lens.

FIG. 1 shows a schematic sectional representation through an optoelectronic sensor 10 in an embodiment as a laser scanner. The sensor 10 in a rough distribution comprises a movable scanning unit 12 and a base unit 14. The scanning unit 12 is the optical measurement head, whereas further elements such as a supply, evaluation electronics, terminals and the like are accommodated in the base unit 14. In operation, the scanning unit 12 is set into a rotational movement about an axis of rotation 18 with the aid of a drive 16 of the base unit 14 to thus periodically scan a monitored zone 20.

In the scanning unit 12, a light transmitter 22 having a plurality of light sources 22a, for example LEDs or lasers in the form of edge emitters or VCSELs, generates with the aid of a common transmission common optics 24 a plurality of transmitted beams 26 having a mutual angular offset that are transmitted into the monitored zone 20. If the transmitted light beams 26 impact an object in the monitored zone 20, corresponding remitted light beams 28 return to the sensor 10. The remitted light beams 28 are conducted from a common reception optics 30 to a light receiver 32 having a plurality of light reception elements 32a that each generate an electric received signal. The light reception elements 32a can be separate elements or pixels of an integrated matrix arrangement, for example photodiodes, APDs (avalanche diodes), or SPADs (single photon avalanche diodes).

The purely exemplary four light sources 22a and light reception elements 32a are shown above one another in the sectional view. In actual fact, at least one of the groups is arranged in preferred embodiments of the invention in a circular figure or on a circular line, as will be explained further below. However, this does not have to relate to physical light sources 22a and light reception elements 32a, but only to the effective transmission points, that do, however, agree therewith here, as starting points of the transmitted light beams 26 and to reception points as end points of the remitted light beams 28. Differing from FIG. 1, it is conceivable to generate a plurality of transmission points with a physical light source or to accommodate a plurality of reception points on the same physical reception module.

The light transmitter 22 and the light receiver 32 are arranged together in the embodiment shown in FIG. 1 on a circuit board 34 that is disposed on the axis of rotation 18 and that is connected to the shaft 36 of the drive 16. This is only to be understood by way of example; practically any desired numbers and arrangements of circuit boards are conceivable. The basic optical design with a light transmitter 22 and a light receiver 32 biaxially disposed next to one another is also not compulsory and can be replaced with any construction design known per se of single-beam optoelectronic sensors or laser scanners. An example for this is a coaxial arrangement with or without a beam splitter.

A contactless supply interface and data interface (DI) 38 connects the moving scanning unit 12 to the stationary base unit 14. A control and evaluation (CEU) 40 is located there that can at least partly also be accommodated on the circuit board 34 or at another location in the scanning unit 12. The control and evaluation unit 40 controls the light transmitter 22 and receives the received signals of the light receiver 32 for further evaluation. It additionally controls the drive 16 and receives the signal of an angular measurement unit which is not shown, which is generally known from laser scanners, and which determines the respective angular position of the scanning unit 12.

The distance from a scanned object is measured for the evaluation, preferably using a time of flight process. Together with the information on the angular position from the angular measurement unit, two-dimensional polar coordinates of all the object points in a scanning plane are available after every scanning period with angle and distance. The respective scanning plane is likewise known via the identity of the respective transmitted light beam 28 and its detection in one of the light reception elements 32a so that a three-dimensional spatial zone is scanned overall.

The object positions or object contours are thus known and can be output via a sensor interface (SI) 42. The sensor interface 42 or a further terminal, not shown, conversely serves as a. parameterization interface. The sensor 10 can also be configured as a safety sensor for use in safety engineering for monitoring a hazard source such as a dangerous machine. In this process, a protected field is monitored which may not be entered by operators during the operation of the machine. If the sensor 10 recognizes an unauthorized intrusion into the protected field, for instance a leg of an operator, it triggers an emergency stop of the machine. Sensors 10 used in safety technology have to work particularly reliably and must therefore satisfy high safety demands, for example the standard EN13849 for safety of machinery and the machinery standard EN1496 for electrosensitive protective equipment (ESPE). The sensor interface 42 can in particular be configured as a safe output device (OSSD, output signal switching device) to output a safety-directed switch-off signal on an intrusion of a protected field by an object.

The sensor 10 shown is a laser scanner having a rotating measurement head, namely the scanning unit 12. In this respect, not only a transmission/reception module can rotate along as shown here; further such modules with a vertical offset or an angular offset with respect to the axis of rotation 18 are conceivable. Alternatively, a periodic deflection by means of a rotating mirror or by means of a facet mirror wheel is also conceivable. With a plurality of transmitted light beams 26, it must, however, be noted that how the plurality of transmitted light beams 26 are incident into the monitored zone 20 depends on the respective rotational position since their arrangement rotates by the rotating mirror as known geometrical considerations reveal. A further alternative embodiment pivots the scanning unit 12 to and fro, either instead of the rotational movement or additionally about a second axis perpendicular to the rotational movement to also generate a scanning movement in elevation.

The embodiment as a laser scanner is also advantageous. A multiple sensor without a periodic movement is also possible that then practically only comprises the stationary scanning unit 12 having corresponding electronics, but without a base unit 14, in particular as a variant of a flash LIDAR.

During the rotation of the sensor 10, a respective area is scanned by each of the transmitted light beams 26. A plane of the monitored zone 20 is here only scanned at a deflection angle of 0°, that is with a horizontal transmitted light beam not present in FIG. 1. The remaining transmitted light beams scan the envelope surface of a cone that is designed as differently acute depending on the deflection angle. With a plurality of transmitted light beams 26 that are deflected upward and downward at different angles, a kind of nesting of a plurality of hourglasses arises overall as a scanned structure. These envelope surfaces of a cone are here also sometimes called scanning planes in simplified terms.

In accordance with the invention, the transmission optics 24 and/or the reception optics 30 are configured for an annular image field having an image field angle $\alpha$. The motivation for this will be explained with reference to FIGS. 2a-c.

In the ideal case, the optics 24, 30 should, as in FIG. 2a, image all the image field positions 46 in focus within the image circle 44. In accordance with the introductory discussion, a single lens, however, only does this for a very small image circle 44, whereas a corresponding objective would be too complex and would additionally bring about other optical limitations.

An areal imaging is not necessarily required for a laser scanner since scanning planes having a mutual offset in elevation are already produced by a linear arrangement of light sources 22a and light reception elements 32a. One optics would be sufficient for this purpose that provides a sharp imaging on a linear arrangement of image field positions 46 as in FIG. 2b. However, this is also only possible for larger image circles 44 using a complex objective.

Instead, the sharp imaging is only required for a single image field angle $\alpha$ such as is shown in FIG. 2c where the ring of the image field positions 46 corresponds to the image field angle $\alpha$. The optics design is preferably oriented on the fixed image field angle $\alpha$, which does not preclude the imaging also still being sharp in a certain environment; however, this is no longer a design demand for differing, and in particular smaller, image field angles. The image field angle $\alpha$ having a certain tolerance band of a sufficiently sharp imaging is as large as possible in FIG. 2c, for example $\alpha=\pm15°$, to obtain distances that are large as possible between the beams 26, 28 of the sensor 10. A certain improvement of the angle covered, for example to $\pm8°$, can already be achieved by this restriction to an annular image field. This will be, however, be improved considerably more with the configuration of the optics 24, 30 in accordance with the invention explained below with reference to FIGS. 4 and 5.

FIG. 3 shows in a plan view a preferred arrangement of the light sources 22a or of the light reception elements 32a on a circular line 48a-b. As shown, the optical center axis of the optics 24, 30 preferably passes through the center of the circular line 48a-b. FIG. 3 can relate to the transmission path and/or to the reception path depending on the embodiment so that the reference numerals are shown in dual form.

Due to the arrangement on the circular line 48a-b, only the annular image field corresponding to the image field angle $\alpha$ is effectively used. This arrangement is therefore particularly advantageous; exactly the optimized zones of the optics 24, 30 are utilized. Aberrations of the optics 24, 30 for image field angles differing from $\alpha$ are practically irrelevant.

The difference between a light source 22a and a transmission point 22b was already briefly looked at in connection with FIG. 1. A transmission point 22b is the starting point of a transmitted light beam 26. It can simultaneously be the location of a physical light source 22a. On the one hand, however, a light source 22a as a semiconductor component also has a certain basic shape, here a square basic shape, that is larger than the emission surface itself. It is moreover possible to generate transmitted light beams from a plurality of transmission points 22b using one and the same physical light source 22a. The transmission points 22b are naturally strictly speaking not mathematical points, but rather have a finite extent so that only some points, and in particular the center points, can be arranged on the circular line 48a-b. The statements on the transmission points 22b apply accordingly to the reception points 32b. The arrangement of the transmission points 22b or of the reception points 32b is ultimately relevant for the optical properties of the sensor 10, not that of the light transmitters 22, light sources 22a, light receivers 26, or light reception elements 32a.

In the embodiment in accordance with FIG. 1, each transmission point 22b is implemented by its own light source 22a and each reception point 32b is implemented by its own light reception element 32a. It is alternatively possible to deviate from this in the most varied manner. The same light source 22a can generate transmitted light beams 26 from a plurality of transmission points 22b or even from all the transmission points 22b by a beam splitter element or the like. The light source 22a can be moved mechanically to generate transmitted light beams 26 consecutively from a plurality of transmission points 22b or even from all the transmission points 22b. The transmitted light beam 26 can also move over the circular line 48a or over a part thereof without a mechanical movement of the light source 22a, for instance by means of a MEMS mirror, an optical phased array, or an acousto-optical modulator.

A plurality of reception points 32b can in turn equally be achieved by separate light reception elements 32a such as pixels or pixel zones of an integrated multiple arrangement of light reception elements 32a. A mechanical movement of a light reception element 32a along the circular line 48a or along a part thereof or a corresponding deflection of the remitted light beams 28 by means of a moved MEMS mirror or the like is also conceivable on the reception side. In a further embodiment, the received light of a plurality of reception points 32b or of all the reception points 32b is conducted to a common light reception element. To nevertheless be able to determine the identity of the respective remitted light beam 28, a multiplexing is possible with a sequential activation of transmitted light beams 26 or via a time encoding of the multiple pulse sequence of the transmitted beams.

FIG. 3 shows an example with three transmission points 22b or reception points 32b that are evenly distributed over the circular line 48a-b. Differing from this, various numbers 3, 4, 5, 6, 7, 8, . . . 16 and more are also conceivable in an irregular arrangement.

FIG. 4 shows a schematic representation of a two-lens objective having a first lens 50 and a second lens 52, with both lenses 50, 52 preferably being converging lenses. This objective can be used as a transmission optics 24 and/or as a reception optics 32. It was explained above with respect to FIG. 2 that image field angles of up to ±18° are possible with a single lens optimized for an annular image field. The two-lens objective substantially improves this to ±20° and more.

Two exemplary bundles of rays 54, 56 that are disposed opposite one another with respect to the optical axis and that correspond to the image field angle α are drawn in FIG. 4. The two-lens objective is also optimized for this image field angle α and the annular image field thereby determined.

The first lens 50 reduces the beam diameter of the bundles of rays 54, 56 to a cross-section that is at a maximum still half as large as on the entry into the first lens 50. This reduced cross-section then only impinges a half of the second lens 52. The second lens 52 is thereby always only illuminated by light from one field point at a given position, but not from the field point disposed opposite with respect to the optical axis.

FIG. 5 illustrates these optical properties of the two-lens objective again in a plan view of the second lens 52. Bundles of rays 54, 56 and 54', 56' of oppositely disposed field points do not overlap and do not reach the respective other half of the second lens 52 with respect to the optical axis. Laterally adjacent field points may also result in a specific overlap. The center of the second lens 52 remains without illumination.

These qualitatively explained properties can also be indicated more exactly with reference to the parameters of the two-lens objective. That distance d between the main plane of the first lens 50 and the first optically active surface of the second lens 52 is sought in which all the beams of a bundle of rays 54, 56 to a field point have completely arrived at one side with respect to the optical axis.

The main beam of the light bundle 50, 52 through the center of the first lens 50 has a side offset of tan α*d with a variably conceived d and the relevant marginal beam still has an additional lateral offset of (D1/2)f1*d, where D1 is the diameter used and f1 is the focal length of the first lens 50. Overall, the lateral offset should move the marginal beam beyond the optical axis. A lateral offset of d1/2 is necessary for this. The following inequality therefore has to be satisfied:

$$[(D1/2)/f1+\tan \alpha]*d \geq D1/2,$$

and this can be transformed into $$d \geq (D1*f1)/(D1+2*f1*\tan \alpha).$$

It is advantageous here to select a numerical value for d at least close to the equality. The greater the remaining difference in the inequality, the more the second lens 52 comes into direct proximity with the image plane and can there hardly still develop a useful effect.

The two lenses 50, 52 can be plano-convex, convex-plano, biconvex, and possibly also convex-concave or concave-convex; but in the last two cases still as a converging lens. Classically refractive lenses, Fresnel lenses, or diffractive optics and combinations thereof are possible. The two lenses 50, 52 can differ from one another or coincide with one another in these general shaping properties and effective principles. The two lenses 50, 52 can have different focal lengths f1, f2, different diameters D1, D2, and different shapes.

In an advantageous embodiment, not only the distance between the two lenses 50, 52 is selected with reference to the above-stated inequality, but the selection f2=d' is also made. d' here is the distance between the main planes of the lenses 50, 52 that is a little larger than the distance d depending on the center thickness of the second lens 52.

The front focal plane of the second lens 52 is placed in the main plane of the first lens 50 at this focal length f2. This has the consequence that the main beam runs in parallel with the optical axis in the image plane of the objective; the objective is then therefore telecentric at the image side. Inter alia on the use as a transmission optics 24, this makes it possible that the light sources 22a may be aligned in parallel with one another and do not have to be slanted. Advantages also already result with a non-exact matching of the focal length f2 to the distance d', that is only f2~d', because the main beam angle at the image side is then already considerably reduced in size, albeit not down to 0°.

The diameter D2 of the second lens 52 is furthermore preferably only selected to be as large as the light beams 54, 56 that pass through require. The two-lens objective is then completely determined only by three parameters: The diameter D1 and the focal length f1 of the first lens 50 can be freely selected. The distance d of the second lens 52 results from the above-explained inequality. The focal length f2 is finally placed at the distance d'.

A total focal length f of the objective can also be calculated from these now known parameters using formulas of geometrical (paraxial) optics that are known per se. Conversely, the two-lens objective can only be fixed by its basic paraxial values: The focal length f of the objective, the aperture D=D1 of the objective, and the field angle $\alpha$ of the circular image field.

In a further preferred embodiment with a very large, but still achievable f-number k1:=f1/D1=1 of the first lens, the relationships are simplified in a very graphic manner:

$$d=f1/(1+2 \tan \alpha), \text{ for instance with } \alpha=30°{:}d\approx0.5*f1,$$

$$f2=d'\approx d\approx f1/(1+2 \tan \alpha).$$

All the focal lengths f1, f2 and distances d or d' for the design of the two-lens objective are herewith given for this preferred embodiment for every desired field angle $\alpha$ and for every desired aperture D=D1. All these values can again where required also be directly obtained from the desired values f and D of the objective using the formulas known per se for the calculation of the total focal length of two combined lenses.

Finally, a numerical example will be shown:
Objective focal length f=19 mm
Aperture D=20 mm (diameter of lens 1)→k=D/f=1.05)
First lens F2 glass: f1=29.8 mm, center thickness 4 mm, aspherically convex-plano
Second lens F2 glass: f2 21.6 mm, center thickness 5 mm, spherically convex-plano
Lens distance d=14.8 mm; distance of second lens from the image plane: 4.2 mm
Image field angle $\alpha=\pm15.4°$
Spot diameter 20 µm (=approx. 1 mrad)

The invention claimed is:

1. An optoelectronic sensor for detecting objects in a monitored zone, the optoelectronic sensor comprising:
at least one light transmitter for transmitting a plurality of mutually separated light beams starting from a respective one transmission point;
a transmission optics for the transmitted light beams;
at least one light receiver for generating a respective received signal from the remitted light beams reflected from the objects and incident at a respective reception point;
a reception optics for the remitted light beams; and
an evaluation unit for acquiring information on the objects from the received signals,
wherein at least one of the reception optics and the transmission optics is a two-lens objective for an annular image field with an image field angle $\alpha$ that has a first lens and a second lens, with the first lens being configured such that light beams of every single transmission point and/or reception point with an image field angle $\alpha$ only impinge on half of the second lens.

2. The optoelectronic sensor in accordance with claim 1, wherein the inequality $d\geq(D1*f1)/(D1+2*f1*\tan \alpha)$ is satisfied for the two-lens objective, with a focal length f1 and a diameter D1 of the first lens and a distance d between the first lens and the second lens.

3. The optoelectronic sensor in accordance with claim 2, wherein $d=(D1*f1)/(D1+2*f1*\tan \alpha)$ applies at least approximately.

4. The optoelectronic sensor in accordance with claim 1, wherein the focal length f2 of the second lens corresponds to the distance between the first lens and the second lens.

5. The optoelectronic sensor in accordance with claim 1, wherein the first lens has a small f-number k1.

6. The optoelectronic sensor in accordance with claim 5, wherein the first lens has an f-number k1=1.

7. The optoelectronic sensor in accordance with claim 1, wherein the transmission points are arranged on a first circular line.

8. The optoelectronic sensor in accordance with claim 1, wherein the reception points are arranged on a second circular line.

9. The optoelectronic sensor in accordance with claim 1, that has a plurality of light transmitters.

10. The optoelectronic sensor in accordance with claim 9, wherein the optoelectronic sensor has one light transmitter per transmission point.

11. The optoelectronic sensor in accordance with claim 1, that has a plurality of light receivers.

12. The optoelectronic sensor in accordance with claim 11, wherein the optoelectronic sensor has one light receiver per reception point.

13. The optoelectronic sensor in accordance with claim 1, wherein the light transmitter and the light receiver form a coaxial arrangement and the transmission optics and the reception optics are combined in a common optics.

14. The optoelectronic sensor in accordance with claim 1, that is configured as a laser scanner and has a movable deflection unit with whose aid the transmitted light beams are periodically conducted through the monitored zone.

15. The optoelectronic sensor in accordance with claim 14, wherein the deflection unit is configured in the form of a rotatable scanning unit in which at least one of the light transmitter and the light receiver is accommodated.

16. The optoelectronic sensor in accordance with claim 1, wherein the evaluation unit is configured to determine a distance of the objects from a time of flight between the transmission of the light beams and the reception of the remitted light beams.

17. A method of detecting objects in a monitored zone in which a plurality of mutually separated light beams are transmitted from a transmission optics starting from a respective transmission point; in which a respective received signal is generated from the remitted light beams reflected from the objects and incident at a respective reception point after passing through a reception optics; and in which the received signals are evaluated to acquire information on the objects,
wherein at least one of the reception optics and the transmission optics is a two-lens objective for an annular image field with an image field angle $\alpha$ that has a first lens and a second lens; and wherein due to the design of the first lens, bundles of rays of every single transmission point and/or reception point with an image field angle α only impinge on half of the second lens.

* * * * *